July 18, 1961 J. C. VITTONE 2,992,835
SPRING-BAR ASSEMBLY FOR SWING-AXLE AUTOMOBILES
Filed March 22, 1960

INVENTOR.
JOSEPH C. VITTONE

BY
ATTORNEY.

United States Patent Office 2,992,835
Patented July 18, 1961

2,992,835
SPRING-BAR ASSEMBLY FOR SWING-AXLE AUTOMOBILES
Joseph C. Vittone, Riverside, Calif., assignor to European Motor Products, Inc., Riverside, Calif., a corporation of California
Filed Mar. 22, 1960, Ser. No. 16,710
4 Claims. (Cl. 280—124)

This invention relates to a spring-bar assembly for mounting on swing-axle automobiles, and more particularly on the rear axle assemblies of such automobiles.

An object of the invention is to provide a simple and economical, yet highly effective, spring apparatus adapted to divide the load more evenly between the two rear wheels of a swing-axle automobile while such automobile is turning a corner, traveling over rough roads, etc., thereby greatly increasing the safety and roadability of the automobile.

Another object of the invention is to provide a spring assembly adapted to prevent violent changes in the suspensions for the rear wheels of a swing-axle automobile, for example during periods when the automobile is changing from a normal cornering attitude to a skidding attitude.

A further object is to provide an apparatus which may be readily mounted on a swing-axle automobile in a short period of time, and for a relatively small amount of money, yet which is highly effective to improve the stability and traction thereof, so that the automobile is rendered safer when driven in high winds or at high speeds as well as during normal driving.

A further object of the invention is to provide a spring assembly adapted to prevent dangerous over-steer, prevent excessive lean, stabilize ride over rough roads, and prevent raising of the roll axis during cornering.

These and other objects and advantages of the invention will be more fully set forth in the following specification and claims, considered in connection with the attached drawing to which they relate.

Figure 1:
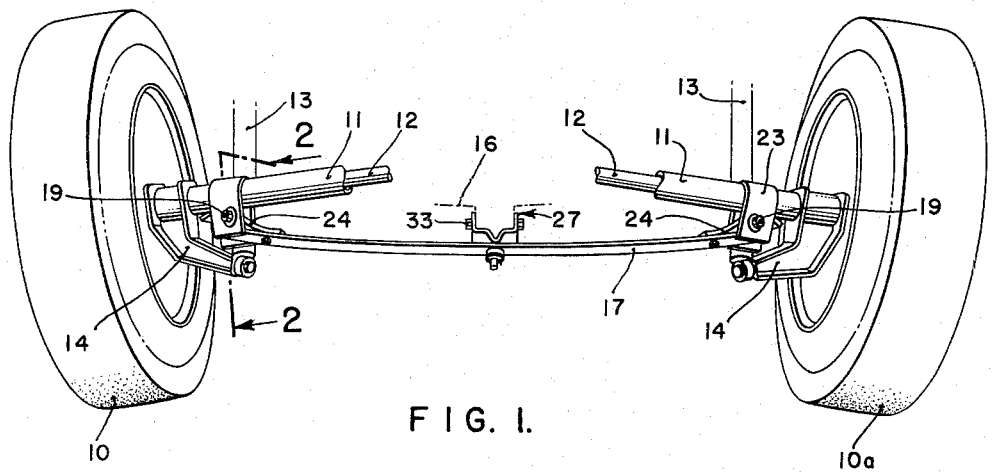
FIGURE 1 is a schematic transverse view illustrating the rear wheels and portions of the axle housings and axles of a conventional swing-axle automobile as viewed from behind, the transmission case and portions of the suspensions being indicated in phantom lines.

Referring to the drawing, the invention is illustrated as associated with the rear wheels 10 and 10a of substantially any conventional swing-axle automobile. Indicated in FIGURE 1, in addition to the wheels 10 and 10a, are axle housings 11 and axles 12 associated with the wheels, and also various elements 13 and 14 of the suspensions. The transmission case is indicated at 16, being disposed directly between the rear wheels 10 and 10a. The axles 12 and axle housings 11 are pivotally associated with the transmission in the conventional manner, so that the suspensions for the rear wheels are independent.

Proceeding next to a description of the apparatus of the invention, this comprises an elongated flat spring 17 having a length somewhat less than the spacing between rear wheels 10 and 10a. The ends of the spring 17 are rolled upwardly to form tubular portions 18 indicated in FIGURE 3. Each of the portions 18 is adapted to receive a bolt 19 having a diameter substantially smaller than the inner diameter of the associated portion 18, so that rubber bushings or sleeves 21 may be mounted around the bolt.

Figure 2:
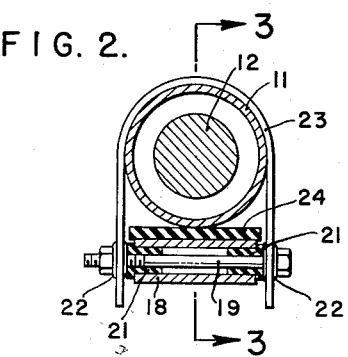
FIGURE 2 is a transverse section taken on line 2—2 of FIGURE 1.
Figure 3:
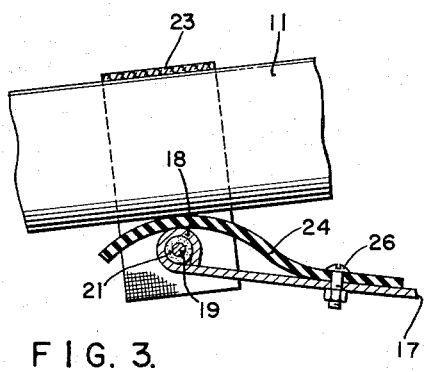
FIGURE 3 is a section on line 3—3 of FIGURE 2.
Figure 5:
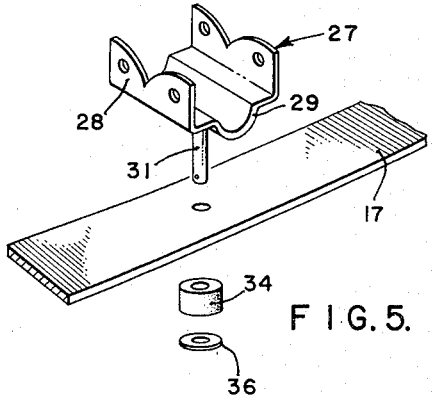
FIGURE 5 is an exploded perspective view of the fulcrum means shown in FIGURE 4.
Figure 4:
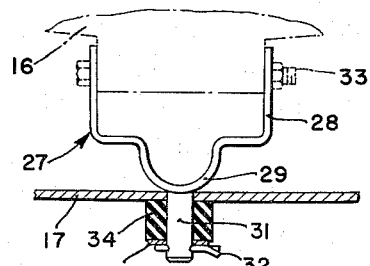
FIGURE 4 is a fragmentary section taken transversely of the center portion of the automobile, illustrating the fulcrum means for associating the spring with the transmission case.

The ends of each bolt extend through metal eyelets 22 provided in the arms of a stirrup member 23 which may be formed of rayon belting or the like. The base portion of each stirrup member 23 is disposed around an axle housing 11, as best shown in FIGURES 2 and 3, the result being that the ends of the spring are respectively associated with the opposite axle housings 11. A rubber tongue 24 is mounted longitudinally above each end of spring 17, by means of a bolt assembly 26 (FIGURE 3) extended through a hole in the spring, the outwardly projecting end of the tongue being inserted between axle housing 11 and the upper surface of tubular spring portion 18.

It is to be understood that the rubber bushings 21 and the tongue 24 operate, in conjunction with the stirrup 23, bolt 19 and tubular portion 18, to maintain each spring end in closely associated relationship with the axle housing, and in the absence of substantial wear or noise.

Proceeding next to a description of the means for pivotally associating the center of spring 17 with transmission case 16, this comprises a fulcrum and mounting bracket 27 which is generally channel-shaped in section, having side flanges 28. The center of the web of bracket 27 is formed integrally with a fulcrum portion 29 which is parallel to the flanges 28 and is convex as viewed from the underside of the bracket. Rigidly anchored in the center of fulcrum portion 29 is a downwardly-extending vertical pin 31 having a transverse bore through the lower end thereof adapted to receive a cotter pin 32.

The bracket 27 is readily mounted on the transmission case 16 by merely removing the two standard transmission-case bolts 33 which form part of the automobile, disposing bracket 27 so that the side flanges 28 are straddled or nested adjacent the sides of the transmission case, and re-inserting the bolts 33 through suitable openings in the side flanges 28. The nuts for the transmission-case bolts are then re-mounted and tightened.

It is to be understood that the bracket 27 is associated with spring 17 at the factory, the pin 31 being inserted through a corresponding hole in the center of spring 17. A rubber sleeve or ferrule 34 is mounted around the pin beneath the spring 17, a metal washer 36 is mounted beneath the sleeve 34, and the cotter pin 32 is inserted to lock the sleeve and washer firmly in position. Rubber sleeve 34 is compressed somewhat before insertion of the cotter pin, so that the entire assembly is characterized by a minimum of relative movement and by the absence of noise or substantial wear.

Summary of assembly, and operation

The tongues 24 may be assembled with the spring 17 at the factory, and the stirrups 23 may likewise be assembled with bolts 19, bushings 21 and tubular portions 18 at the factory. Also, as stated above, the assembly between pin 31, ferrule 34, washer 36 and cotter pin 32 may be made at the factory.

Before mounting the apparatus on an automobile, such automobile is preferably placed on a hoist or jack in such manner that the rear axles hang free. The portions of the rear axle housings 11 adjacent the shock absorbers (numbered 13) are then cleaned of dirt and the like, and the stirrups 23 are mounted thereover by merely removing the lock nut at the end of each bolt 19, shifting one arm of each stirrup 23 off the threaded end of the bolt 19, moving such arm of the stirrup over the axle housing 11, repositioning such arm of the stirrup over the end of bolt 19, and re-mounting the lock nut. The bracket 27 is mounted on the transmission case 16, as above described and after suitable cleaning thereof, by merely removing the bolts 33, disposing the bracket in position and then re-mounting the bolts.

When the automobile is driven, the assembly operates to effect a more uniform distribution of weight between the rear wheels 10 and 10a. Let it be assumed, for example, that the automobile is making a right turn, which effects raising of the left rear wheel 10 relative to the frame and body of the automobile and tends to effect lifting of the right rear wheel 10a off the ground. However, with the present apparatus, such raising of the left rear wheel 10 effects a clockwise pivotal movement of spring 17 as viewed in FIGURE 1, which has the effect of pulling the axle housing 11 for the right rear wheel 10a downwardly and thus greatly increasing the traction between the right rear wheel 10a and the ground. The described operation prevents raising of the roll center of the vehicle, so that there is substantially lessened tendency for the vehicle to tip over when a corner is turned excessively sharply.

The present apparatus greatly stabilizes the operation of the vehicle on rough roads. Thus, should one rear wheel 10 strike a bump at high speed on a rough road, the spring 17 operates to prevent excessive and wild movements of the axle housing 11 for such rear wheel 10. The spring 17 serves to correlate and inter-relate the movements of the rear wheels 10 and 10a in a manner which improves the stability of the vehicle. The apparatus eliminates excessive body lean, and greatly reduces the danger of loss of control when the vehicle is driven at high speeds or in gusty cross winds. Directional stability is greatly improved, and "wind wander" is substantially reduced even when wind velocities are high.

It is an important feature of the invention that the present apparatus prevents violent changes in the rear-wheel suspensions when the vehicle goes into a skid upon turning a sharp corner. In the ordinary swing-axle automobile, without the present apparatus, the rear axles "hump up" and may lift the inside rear wheel off the ground when the car changes from a normal cornering attitude to a skidding attitude, it being understood that traction is suddenly decreased at this time. With the present apparatus, the spring 17 prevents such action because the load is divided more evenly between the two wheels, and because there is a much smaller deflection in the suspension as a whole. The transition from the normal cornering attitude to the skidding attitude is rendered much safer and more manageable for the driver of the vehicle.

Various embodiments of the present invention in addition to what has been illustrated and described in detail may be employed without departing from the scope of the accompanying claims.

I claim:

1. In combination with an automobile having independently-suspended rear wheels, each of said rear wheels being connected to an axle and axle housing which extend inwardly and are pivotally associated with a transmission having a case, an elongated flat metal spring having end portions which are curved into tubular shape, flexible stirrup elements mounted over each of said axle housings and having arms which extend downwardly adjacent the ends of said tubular spring end portions, fastener means to connect said arms of said flexible elements to said tubular end portions of said spring, a generally channel-shaped fulcrum and support bracket connected to said transmission case and having a fulcrum portion at the lower side thereof, a pin fixedly associated with said fulcrum portion and extended downwardly through an opening in the center of said spring, and resilient means to maintain the center of said spring closely associated with said fulcrum portion of said bracket.

2. The invention as claimed in claim 1, in which each of said fastener means comprises an elongated bolt extending through each of said tubular spring end portions, and in which elastomeric bushings are provided between said bolt and the internal wall of said tubular portion.

3. The combination with an automobile having independent rear axle assemblies each of which is associated with a rear wheel of the automobile, the inner portions of said axle assemblies being independently pivotally associated with the transmission of the automobile whereby said axle assemblies may pivot in substantially vertical planes, of a spring-bar assembly comprising an elongated metal spring-bar, means to connect the end portions of said spring-bar to said axle assemblies, and means to connect the center of said spring-bar to the transmission case of said automobile, said last-named means comprising a fulcrum and mounting bracket bolted to the lower portion of said transmission case, said bracket having a raised lower portion adapted to provide a fulcrum for the center of said spring-bar, a pin rigidly associated with said lower fulcrum portion of said bracket and extending downwardly through an opening in said spring-bar, a rubber ferrule mounted around said pin immediately beneath said spring-bar, and stop means provided on said pin to maintain said ferrule in compression against the underside of said spring-bar.

4. The combination with an automobile having independent rear axle assemblies each of which is associated with a rear wheel of the automobile, the inner portions of said axle assemblies being independently pivotally associated with the transmission of the automobile whereby said axle assemblies may pivot in substantially vertical planes, of a spring-bar assembly comprising an elongated metal spring-bar, fulcrum means to connect the center of said bar to the transmission case of said automobile, and means to connect each end portion of said spring-bar to one of said axle assemblies, said last-named means comprising a flexible stirrup mounted over said axle assembly and having downwardly extending arms, means to resiliently associate the lower ends of said arms with the end of said spring-bar, and an elastomeric tongue mounted on said spring-bar and extending between said arms of said stirrup, said tongue bearing between the underside of said axle assembly and said spring-bar.

References Cited in the file of this patent
UNITED STATES PATENTS 2,784,794    Barenyi _____ Mar. 12, 1957

FOREIGN PATENTS 1,161,498    France _____ Mar. 24, 1958